United States Patent [19]

Dubuit

[11] 4,233,754

[45] Nov. 18, 1980

[54] APPARATUS FOR ULTRAVIOLET DRYING AND/OR CURING OF SOLVENT-FREE INK ON THREE-DIMENSIONAL ARTICLES

[76] Inventor: Jean-Louis Dubuit, 60, Rue Vitruve, 75020 Paris, France

[21] Appl. No.: 877,720

[22] Filed: Feb. 14, 1978

[30] Foreign Application Priority Data

Feb. 18, 1977 [FR] France ................................ 77 04667

[51] Int. Cl.[3] ................................................ G01B 5/20

[52] U.S. Cl. ........................................... 34/203; 34/39; 34/105; 118/642; 432/124; 427/54.1

[58] Field of Search ................. 34/4, 39, 42, 104, 105, 34/201, 208, 203; 427/54, 55; 126/41 C; 99/386, 451; 118/642; 432/124; 101/40, 38

[56] References Cited

U.S. PATENT DOCUMENTS

| | | | |
|---|---|---|---|
| 1,412,593 | 4/1922 | Allsop et al. | 34/207 |
| 2,199,584 | 5/1940 | Bemis | 99/386 X |
| 2,219,166 | 10/1940 | Schaefer | 34/208 |
| 2,626,341 | 1/1953 | Bolling | 99/386 |
| 3,182,589 | 5/1965 | Green et al. | 101/40 |
| 3,829,982 | 8/1974 | Pray et al. | 34/4 |
| 3,894,343 | 7/1975 | Pray et al. | 34/4 |
| 3,930,318 | 1/1976 | Stelter et al. | 34/4 |
| 3,934,500 | 1/1976 | Jackson | 101/38 A |
| 3,935,647 | 2/1976 | Aschberger | 34/105 |
| 4,050,412 | 9/1977 | Bautz | 34/4 X |
| 4,072,099 | 2/1978 | Martin | 34/4 X |

FOREIGN PATENT DOCUMENTS

| | | | |
|---|---|---|---|
| 675231 | 10/1929 | France | 34/208 |

*Primary Examiner*—Edward G. Favors
*Attorney, Agent, or Firm*—Charles E. Brown

[57] ABSTRACT

Apparatus for ultraviolet drying and/or curing of freshly applied solvent-free ink on three-dimensional articles such as containers. Baskets for carrying the articles are swivelly mounted at spaced locations on an endless conveyor. The conveyor pathway has a bend or loop when viewed in elevation, the shape of which is determined by a drum or sprocket. A tubular ultraviolet lamp is arranged, preferably in the crook of the bend or loop, parallel to the axis of curvature of the bend or loop. The baskets are of perforate construction, preferably comprising wire strips in planes which intersect along lines parallel to their respective swivel axis. The lamp irradiates a predetermined sector of each passing article in the course of displacement over the bend or loop; shadows falling on the articles due to nonperforate portions of the baskets move continuously along the predetermined sector so that no spot on the predetermined sector is constantly obstructed from the ultraviolet radiation.

17 Claims, 8 Drawing Figures

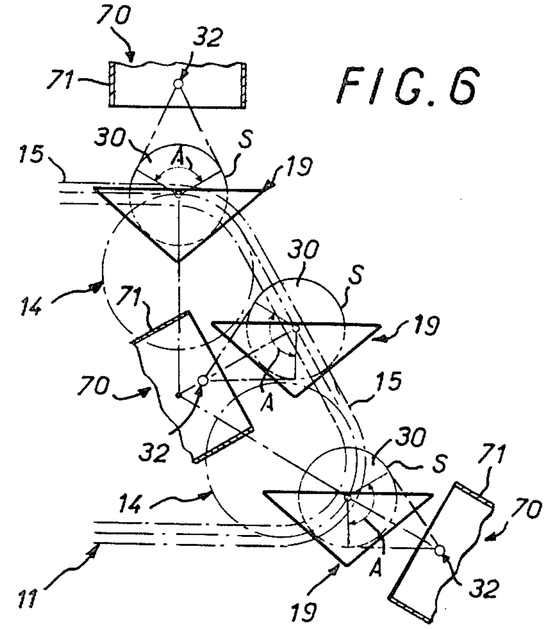
FIG. 6
FIG. 8
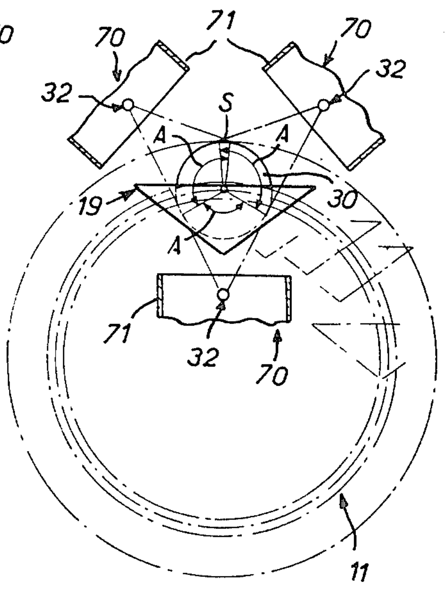
FIG. 7
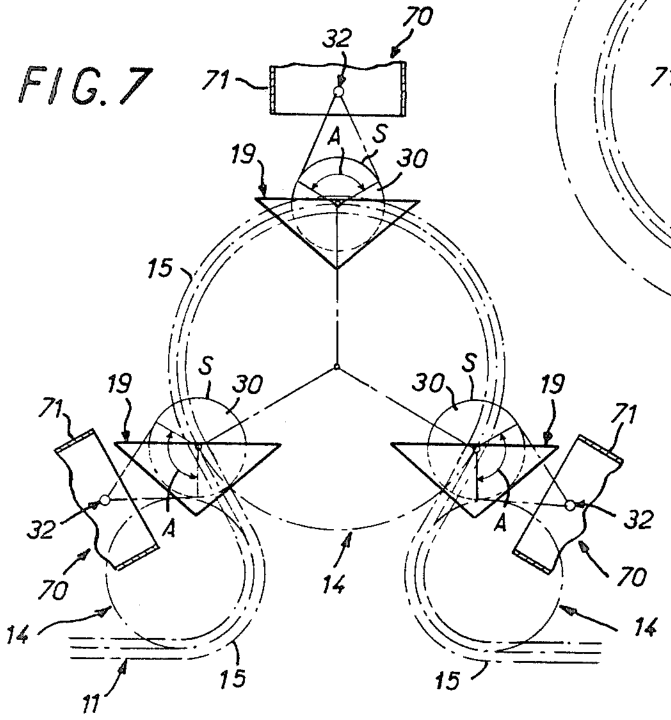

APPARATUS FOR ULTRAVIOLET DRYING AND/OR CURING OF SOLVENT-FREE INK ON THREE-DIMENSIONAL ARTICLES

The present invention relates generally to ultraviolet drying apparatus, and more particularly to drying apparatus for three-dimensional articles, such as bottles or containers, for drying and/or curing previously applied solvent-free ink.

Drying apparatus commonly employed for drying such three-dimensional articles are ovens generally comprising an enclosure and an endless belt type conveyor which is equipped with holders each for receiving one such article, the configuration of the pathway of the conveyor inside the enclosure including one or more bends or loops, for example, U-shaped or channel-shaped bends or loops.

Such drying apparatus are satisfactory when the ink used contains a solvent initially which is then evaporated. This is not the case where, as mentioned above, a solvent-free ink is utilized.

It has already been contemplated to use, in such cases, drying apparatus which are equipped with one or more sources of ultraviolet radiation inside their enclosures.

A number of problems remain to be overcome with such apparatus.

First of all there is the optimum utilization of the radiation emanating from the ultraviolet lamps which are the usual sources of ultraviolet radiation. It is generally accepted nowadays that it is mandatory to associate a reflector with such an ultraviolet lamp.

Ultraviolet drying apparatus were at first used for curing and drying ink applied to flat sheets, whether they were sheets of paper as disclosed in U.S. Pat. No. 3,829,982 (Pray et al) granted on Aug. 20, 1974, or sheets of metal as disclosed in U.S. Pat. No. 3,930,318 granted on Jan. 6, 1976 (Selter et al), naturally it was proposed that the reflector be of parabolic or elliptical section, for reflecting toward the sheets parallel ultraviolet rays, the sheets passing in front of a corresponding source of ultraviolet radiation, located beyond the source relative to the reflector.

Subsequently ultraviolet radiation drying apparatus were used for drying and curing three-dimensional articles; most often the same arrangements were used, as disclosed in U.S. Pat. Nos. 3,935,647 granted on Feb. 3, 1976 (Aschberger) and 3,934,500 granted on Jan. 27, 1976 (Jackson).

Yet if such apparatus were satisfactory for drying a flat surface, such as a simple sheet, this is not so when drying an article having a curved surface, such as is often the case with three-dimensional articles such as containers, regardless of whether the cross-section is circular or oval or the outer surface is cylindrical or conical.

Therefore, an ultraviolet drying apparatus perfectly adapted for drying a three-dimensional article of circular cross-section, for example, is not necessarily suitable for drying a three-dimensional article of another section.

Difficulties therefore arise in adapting such ultraviolet drying apparatus to drying and/or curing three-dimensional articles of different cross-sections.

Further, as the entire outer surface of such a three dimensional article is to be dried and/or cured, it is usually accepted at the present time that nothing should be allowed to come between the three-dimensional article to be dried and the corresponding ultraviolet radiation source, and when the three-dimensional article passes in front of the source of radiation it is necessary to make it revolve about its axis in order that its entire surface may face the source (See U.S. Pat. Nos. 3,935,647 and 3,934,500).

Owing to the first requirement, the three-dimensional article to be dried are mounted on a mandrel which thus restricts the use of such drying apparatus, in practice, three-dimensional articles having a large enough opening for stable engagement with the mandrel and therefore precludes the use of such apparatus for relatively narrow neck bottles, or they must be clamped or squeezed between their mouth and bottom which complicates the construction of the mechanical part of the drying apparatus.

Owing to the second requirement, there is a need for employing a relatively complicated arrangement adapted to revolve the three-dimensional articles around their axes.

Another problem to overcome with ultraviolet drying apparatus is safety, bearing in mind that it is evidentally necessary to see to it that men or women working on or around the machine are not exposed to the ultraviolet radiation.

A general object of the present invention is to provide various features and arrangements for particularly satisfactory solutions to the problems briefly referred to above, going against generally accepted principles in this field and advantageously expanding the field of application of such ultraviolet drying apparatus to all kinds of three-dimensional articles.

A more specific object of the present invention is the provision of an improved apparatus for ultraviolet drying and/or curing solvent free ink on three-dimensional articles, comprising a housing, an endless conveyor arranged at least partly inside said housing and having at longitudinally spaced locations baskets for carrying articles bearing ink to be dried and/or cured, said conveyor having a pathway including, in elevation, at least one bend or loop inside said housing, said bend or loop having an axis of curvature, an elongate ultraviolet lamp disposed proximate to said bend or loop for irradiating a predetermined sector of each article passing over said bend or loop, means for swivelly mounting said baskets on said conveyor about axes parallel to said axis of curvature, said baskets being of perforate construction with perforate and nonperforate portions arranged so that shadows due to the nonperforate portions continuously move along the predetermined sectors of the articles thereby avoiding constantly obstructed spots in the predetermined sectors.

Thus, according to the invention, the holder members are baskets into which the articles are merely placed or dropped.

Such baskets are in themselves well known per se as evidenced by U.S. Pat. No. 3,182,589 (Green et al) for use in conventional hot air drying ovens.

Yet, as applied to ultraviolet drying apparatus they would appear to be poorly suited since, as the drying and/or curing performed in ultraviolet drying apparatus it is important to eliminate any sort of barrier or shield between the source of radiation and the article being dried and/or cured.

According to the invention this problem is overcome by making the baskets perforate. As is known per se, the baskets are of wire construction, with wire strips part-circular along their middle sections at least, between their ends.

In this way the distance between each of the wire strips and the point of contact with the article carried therein quickly increases counting from the point of contact.

Furthermore, each of the wire strips of a said basket lies in a plane, pairs of planes so defined to intersect along lines parallel to the swivel axis of the basket.

The present invention goes against the heretofore generally accepted idea that use of such baskets is unsuitable for ultraviolet drying apparatus.

Other than such baskets facilitating the loading of article to be cured and/or dried on the conveyor, it permits expensive mechanisms for revolving the articles to be dispensed with, and these baskets are suitable for use with all shapes of three-dimensional articles such as bottles, irrespective of their cross-section, mouth diameter, and height, at least over a wide range of sizes.

The drying apparatus according to the invention is thus highly versatile as it needs no adaptation to accommodate different sizes and shapes of articles, and its thus accommodates large mouth bottles as well as narrow neck bottles, regardless of their cross-section.

This versatility in use is accrued due to the fact that it is very easy to employ any number of ultraviolet sources with the apparatus embodying the invention.

According to a first embodiment the conveyor passes around, because of its bend, the tubular ultraviolet lamp which is the source of radiation.

Owing to the tight curve of the conveyor pathway bend around the source of ultraviolet radiation, which is a U-shaped bend and therefore practically reaches 180°, and may even be greater, there is near optimum use of the radiation emitted by the source, even without incorporating reflectors.

Of course, with a view to obtaining even greater efficiency such a reflector may be provided for each source of ultraviolet radiation, so as to reflect the unabsorbed energy.

Still, in this case, and according to a preferred embodiment of the invention, for at least part of the reflector and in practice the greater part thereof, the conveyor entraining the articles to be cured and/or dried passes between the reflector and the source of ultraviolet radiation.

Thus, taking advantage of arrangements known per se in which the conveyor has bends, the present invention here too goes against generally accepted ideas in this field, which normally associate reflectors with such ultraviolet lamps so that the conveyor passes beyond the lamp relative to the reflector.

Consequently, this embodiment is appropriate for the curing and/or drying of three-dimensional articles of any shape or cross-section by reason that the reflectors used are not therefore necessarily elliptical or parabolic.

But, according to a second embodiment of the invention the conveyor does not necessarily loop around a source of ultraviolet radiation. In this embodiment at least three ultraviolet lamps are preferably disposed relative to the conveyor so as to embrace an approximately 120° sector at least in part different from each other, of the solid angle corresponding to the predetermined arcuate portion of an article to be dried and/or cured.

In such an embodiment, the length of the section of the conveyor along which the lamps are arranged may in practice by relatively short, which promotes effective drying and/or curing; in addition, the total length of the conveyor may therefore be relatively short which is of interest as such a conveyor is oxydized and therefore must be changed periodically.

Further, it is then possible to employ conventional ultraviolet lamps which most often are fitted with their own reflectors which in practice are elliptical reflectors. In this event it is sufficient to mount the ultraviolet lamps adjustably relative to the conveyor in order to accommodate articles of different cross-sections.

In any event it is very easy with the drying apparatus embodying the present invention to utilize various masks and shades capable of protecting any nearby workman from the radiation emitted by the sources of ultraviolet radiation.

Features and advantages of the invention will be brought out in the description which follows, given by way of example, with reference to the accompanying schematic drawings, in which:

FIGS. 6 to 8 are diagrammatical and fragmentary elevational view of other ultraviolet drying apparatus of other embodiments of the invention.

According to a first embodiment illustrated in FIGS. 1–5, the drying apparatus comprises a column-like housing 10 in which an endless conveyor 11 has its path of travel, which continues laterally on one side to a loading station 12 and on the other side to a discharge station 13.

Figure 1:
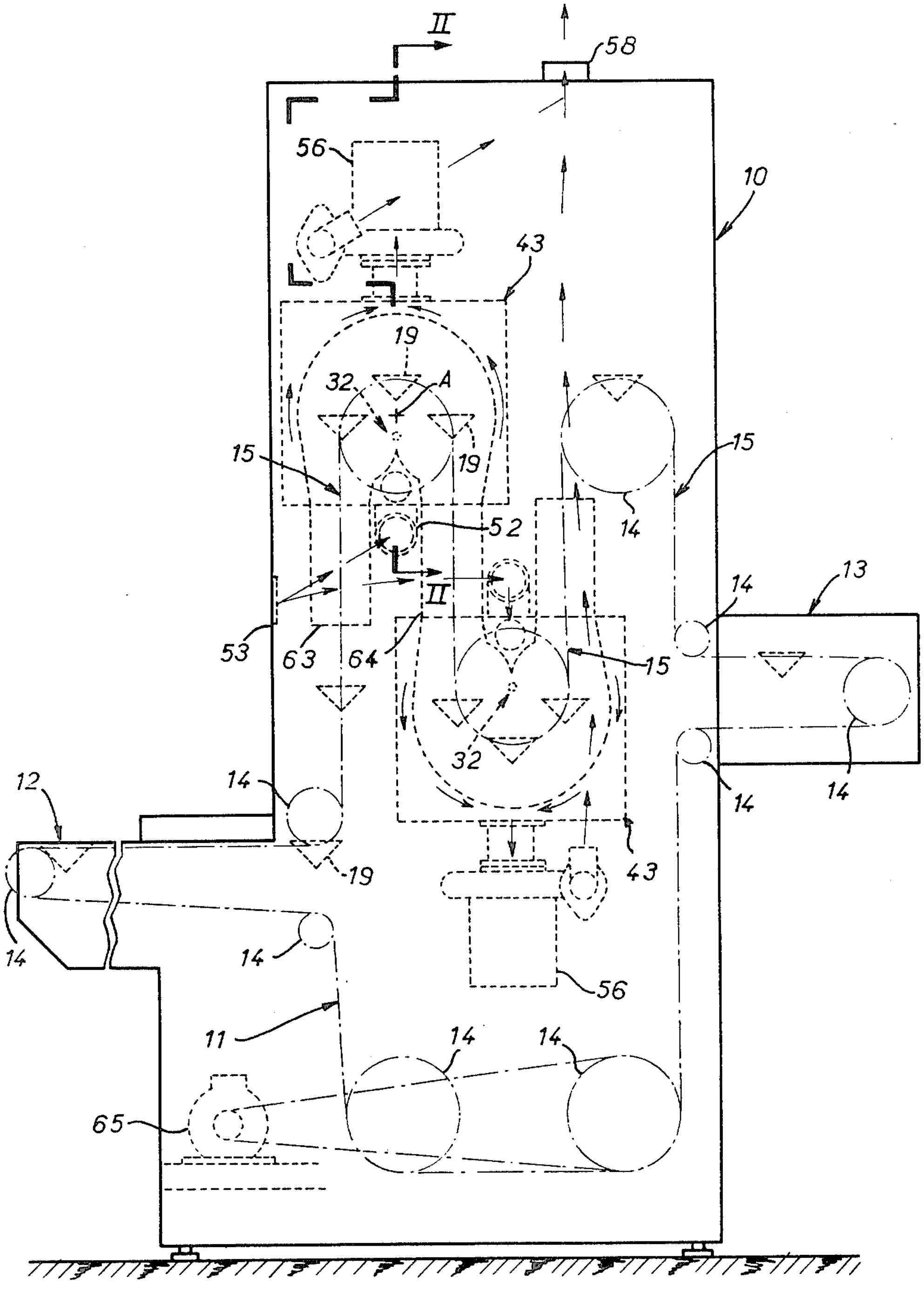
FIG. 1 is an elevational view of a first embodiment of the ultraviolet radiation drying apparatus according to the invention.

Such a conveyor 11 is well known per se and will not be described in detail herein; it is not represented in detail in the drawings, either, where for example in FIG. 1 it is diagrammatically represented in dash-dotted lines by its pathway inside the housing 10. It is to be noted, however, that in a conventional manner by passing over intermediate wheel members, e.g. drums or sprockets, which are for the most part designated by numeral 14 in FIG. 1, the pathway of the conveyor 11 inside the housing 10 includes at least one bend or loop 15. In the illustrated embodiment three such horseshoe-shaped bends or loops 15 are arranged in succession.

Figure 2:
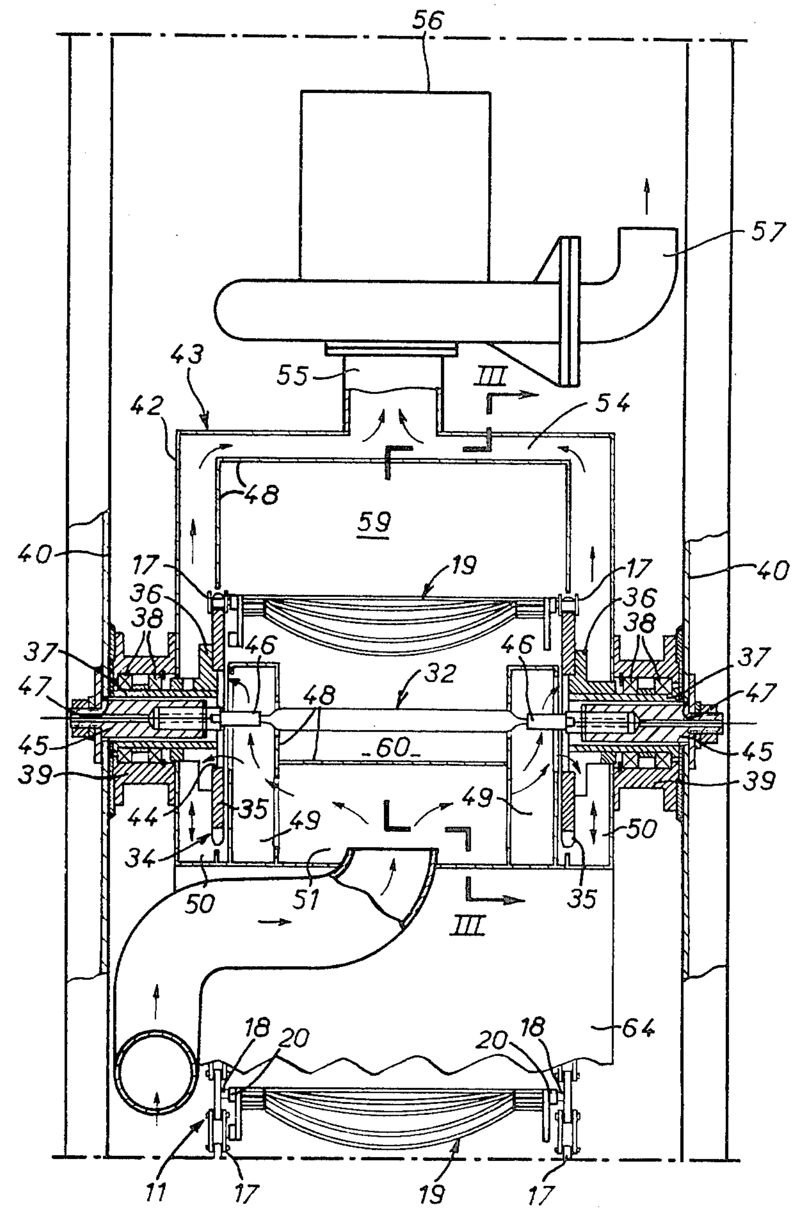
FIG. 2 is an enlarged fragmentary sectional view of the apparatus, taken on broken line II—II in FIG. 1.

It is also to be noted that as illustrated the conveyor 11 is comprised of two parallel chain belts 17 the links of which carry at longitudinally spaced locations aligned pairs of pins 18 for swivelly mounting the carrier baskets 19, FIG. 2. As best viewed in FIGS. 4 and 5, each of the carrier baskets 19 comprises at its ends two triangular support flanges 20.

A bushing 21 projects from each of the opposed faces of the flanges 20 and is journalled on the pins 18 on the chain 17, one of these flanges 20 also has a tongue 22 projecting parallel to the corresponding bushing 20 cooperable with guideways (not shown) in straight sections of the pathway of the conveyor 11.

Each carrier basket 19 is swivelly mounted about a swivel axis parallel to the axis of the intermediate wheel members over which the conveyor 11 passes and therefore to the axes of curvature of the corresponding horseshoe shaped bends or loops in the conveyor pathway.

The carrier baskets are perforate and, in the illustrated embodiment, of wire construction: a bundle of wire strips 22 extend from the opposed flanges where they are joined so that the wire strips themselves define the carrier basket 19 per se.

Figure 5:
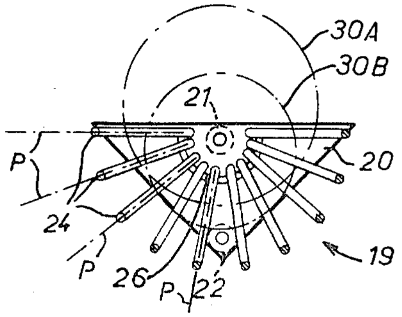
FIG. 5 is a cross-sectional view, taken on the line V—V in FIG. 4.

According to the invention each of the wire strips 24 lying in a plane has a middle section which is generally part-circular in curvature; the planes P intersect in pairs along lines parallel to the swivel axis of the corresponding carrier basket as it is visible in FIG. 5 where the planes P are represented by dash-dotted lines for some of the wire strips 24. It will be noted that the planes P generally radiate from the swivel axis of the carrier basket 19 even though their intersections do not necessarily coincide with the swivel axis.

In the illustrated embodiment the ends of the wire strips 24 proximate to the end flanges 20, are joined in a bundle 25, parallel to one another to be fixed together, for instance, by welding. In addition, the ends of the wire bundle 25 are bound by a transverse reinforcing band 26 at a distance from the corresponding end flange 20.

Figure 4:
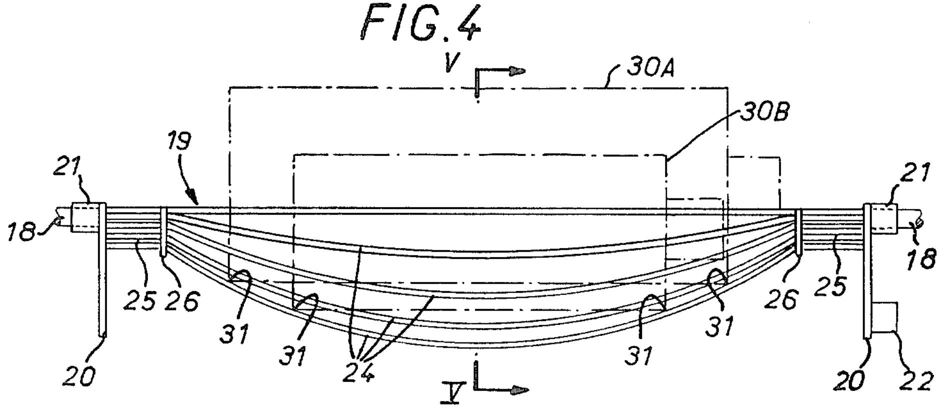
FIG. 4 is an enlarged elevational view of one of the baskets for carrying articles on the conveyor of the drying apparatus.

As illustrated in dash-dotted lines in FIGS. 4 and 5 such a carrier basket 19 is adapted to accommodate three-dimensional articles such as bottles 30A, 30B of different sizes. The bottles are shown as having circular cross-sections but they may be of any kind of configuration.

In any event it will be noted in FIG. 4 that for each wire strip 24 the surface of the bottle 30A, 30B quickly affects, by reason of the curvature of the wire strip 24, the point of contact 31.

In the first embodiment of FIGS. 1–5 at least one of the horseshoe bends 15 in the conveyor pathway is utilized for looping around a source 32 of ultraviolet radiation. Such a source 32 of ultraviolet radiation is disposed in the crook of each the first two horseshoe bends 15 in the conveyor pathway; it goes without saying that so could the third and last horseshoe bend in the conveyor pathway.

In practice, and as known per se, an ultraviolet radiation source comprises an elongate tubular lamp but, according to the invention, the lamp is arranged generally parallel to the axes of the intermediate wheel members over which the conveyor 11 passes, and therefore to the axes of curvature of the corresponding horseshoe bends in the conveyor pathway. Likewise, in practice and as illustrated, such a lamp extends substantially along the axis of one of the intermediate wheel members which will now be described in greater detail with reference to FIG. 2.

As is known per se the intermediate wheel member, designated generally by reference numeral 34, comprises two parallel sprockets 35, each of the chains 17 of the conveyor running over and meshing with one of the sprockets 35. The sprockets are each mounted, e.g. by threaded engagement, on a collar 36 which extends radially from a support hub 37. The support hub 37 is centered at its outer end with interposed anti-friction bearings 38 on a retaining sleeve 39 which extends between the transverse wall 40 of the housing 10 and the outer wall 42 of a double-walled ventilation duct 43 described in greater detail hereinafter.

Equally for reasons which will become clearer below, the radial collar 36 on the hub 37 is apertured with one or more vent holes 44.

At its internal surface each hub 37 is mounted coaxially about a fixed sleeve 45 adapted to receive one of the axial end bases 46 of the lamp which constitutes the source of ultraviolet radiation 32. Such a sleeve 45 is arranged in line with a passageway 47 in the transverse wall 40 of the housing 10 to enable removal and for giving access to the lamp 32.

As mentioned above a double-walled ventilation duct 43 is associated with the lamp 32. The lamp 32 is generally disposed inside the duct 43, but each of the axial end bases 46 protrudes outside the inner wall 48 of the duct into a lateral portion 49 of the space between the wall of the duct communicating with another lateral part 50 of the space, continuous with the previous one, via vent holes 44 in the hub 37 carrying the corresponding sprocket 35, the sprocket forming a shiftable partition between the lateral portions 49 and 50 of the space.

The lower part 51 of the space between the walls of the duct 43 is connected by a conduit 52 to a suction orifice 53, FIGS. 1 and 2.

The lower part 54 of the space between the walls of the duct 43 is connected by a conduit 55 to the ear or inlet side of a fan 56 which forces air through conduit 56 connected to the outlet orifice 58. Because of such a fan 56, the space between the walls of the duct 43 is constantly swept with a flow of ventilating air, especially the lateral parts 49 of the space into which the axial end bases 46 of the lamp 52 protrude, which end bases are thereby advantageously cooled.

The forced air flow corresponding to the two air ducts 43 respectively associated with lamps 32 is as shown by arrows in FIGS. 1 and 2, defining parallel circuits between the inlet and outlet orifices 53 and 58 of the housing 10.

The internal wall 48 of each duct 43, more particularly the axial part thereof, is also used as a reflector of radiant energy. The corresponding reflector comprises a first portion 59 which is overall of cylindrical configuration, with its concave surface facing the convex portion of the conveyor pathway in the corresponding horsehoe bend 15, FIG. 3.

Figure 3:
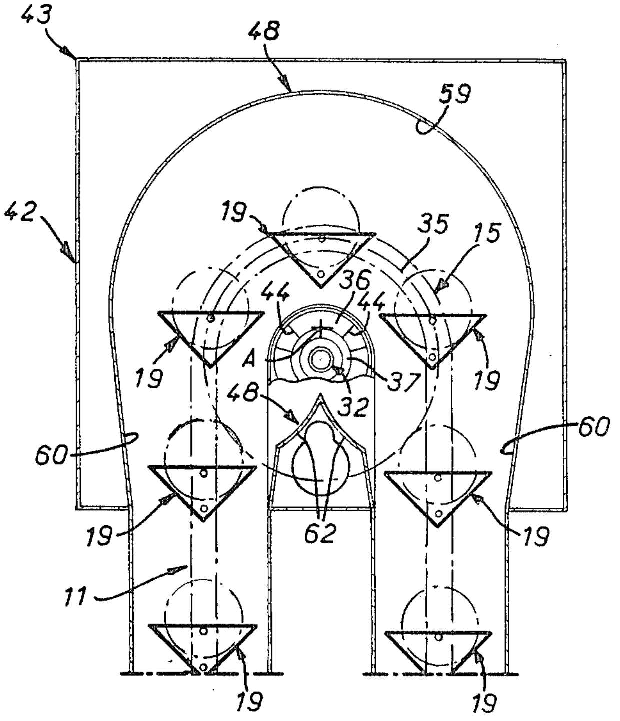
FIG. 3 is another fragmentary sectional view, taken on broken line III—III in FIG. 2.

The axis A of this cylindrical portion 59, which is parallel to the corresponding lamp 32 forming the source of ultraviolet radiation, is spaced from the lamp, this axis being nearer the conveyor 11 than the lamp, FIGS. 1 and 3.

In practice and as shown, the reflector cylindrical portion 59 if the internal wall 48 of the duct 43 is continued laterally by two planar portions 60, which are also part of the internal wall 48, and form reflectors, FIG. 3.

In the illustrated embodiment, the planar portions 60 are slightly convergent which helps confine the ultraviolet rays emitted by the lamp 32, inside the spaced defined by the wall 48.

It is to be emphasized that the conveyor passes between the lamp 32 and the reflector cylindrical portion 59 and planar portions 60 of the internal wall of the duct 43. In the lower part of the duct 43, below the lamp 32, the internal wall 48 also defines two parts of the reflector 62, which are generally of parabolic configuration, and which are arranged back to back, facing the concave portion of the pathway of the conveyor 11 over the corresponding horseshoe bend 15, FIG. 3.

Moreover, the duct 43 is continued downwards by two skirts 63, 64 through which the conveyor 11 respectively enters and exits the duct 43. Further, these skirts 63 and 64 may in turn be extended by preferably converging covers to counter the diffusion of ultraviolet radiation from the lamp 32 towards the surroundings. Other covers of this type may, in addition, be provided at the base of the column-like housing 10 and at the junction with the loading station 12 and/or discharge station 13.

The conveyor 10 may be driven by one of the intermediate wheel members 14 which in this case is connected to motor means outside the housing 10, for example, operating synchronously with the printing machine with which the conveyor is associated.

Nonetheless, according to the invention, in addition an independent drive motor 65 is associated with one of the intermediate wheel members 14 the speed of the output shaft is less than that of the intermediate wheel member 14 and is joined to the shaft therefor by stepwise, unidirectional advance means, e.g. a ratchet coupling means (not shown). Thus, if the printing machine associated with the conveyor 11 happens to stop for any reason, the drive motor 65 which is normal operation rotates effectively under no load conditions, takes over for driving the conveyor 11 thereby continuing the displacement of the conveyor through the housing 10, and eliminating the likelihood of scorching the articles being dried and/or cured.

In any event the period of time the article spends inside the housing 10 is calculated in conjunction with the quantity of ultraviolet radiation emitted so that an appropriate drying and/or curing of the printed matter on the articles is insured, the drying and/or curing occurring during the displacement of the baskets carrying the articles to be dried and/or cured around each of the ultraviolet sources.

It will have been understood that during the displacement of a carrier basket around an ultraviolet source the shadow of the wire strips 24 falling on the article in the carrier basket moves continuously along the surface of the article such than no spot on the surface escapes the ultraviolet radiation at the end of the pathway of the conveyor.

The article is thus properly dried and/or cured.

The ultimate result is the same in a second embodiment in which the conveyor 15 does not necessarily turn around the ultraviolet sources employed. This embodiment is illustrated in FIGS. 6–8 in which the conveyor 11 and the baskets 19 carried thereon are shown schematically.

In this embodiment each of the sources of ultraviolet radiation are arranged so as to embrace a sector, different from the others, of the solid angle S surrounding the axis of the article 30 to be dried and/or cured; in practice, as the article is cylindrical, the solid angle corresponds to the surface of the article.

Theoretically two source of ultraviolet radiation should suffice, but this leads to grazing radiation and therefore ineffective at the limits of the sectors radiated by the sources; four or more sources of ultraviolet radiation may also be satisfactory but wasteful.

Preferably three ultraviolet sources are put to use, the sector A of the solid angle irradiated by each thus being about 120°. As in the previous embodiment the lamps are tubular and elongate and are disposed parallel to the axes of curvature, of horseshoe bends 15 in the conveyor pathway. However, as they are not embraced by the horseshoe bends in the conveyor pathway and may even be outside the horseshoe bends, this facilitates the choice of their location.

The lamps 32 may be each part of the same ultraviolet lamp unit 70 of the conventional type, comprising an elliptical reflector 71 in addition to the lamp 32; this ultraviolet lamp unit is only partly shown in FIGS. 6–8.

So that, depending on the cross-section of the article to be dried and/or cured, and therefore, the diameter since the article is cylindrical, the sector A of the solid angle S irridiated by one lamp 32 is about 120°, each lamp unit 70 is adjustably mounted relative to the conveyor 11 by means which are known to one having ordinary skill in the art and thus need not be described in detail herein.

Different arrangements of the conveyor 11 are possible.

For instance, with reference to FIG. 6, two intermediate wheel members 114 confer a U-shaped configuration with a slanted interconnecting portion on the conveyor pathway bend; two of the ultraviolet lamp units 70 employed are arranged outside the conveyor opposite their respective intermediate wheel members 14, and the third ultraviolet lamp unit 71 is disposed inside the perimeter of the conveyor pathway, between the first two sprockets 14.

It will be appreciated that the length of the run of the conveyor 11 along which the three ultraviolet lamp units are mounted is shortened.

In a variant in FIG. 7 three intermediate wheel members 14 are provided which results in a loop of Ω-shaped configuration; the three ultraviolet lamp units 70 are arranged outside the perimeter of the conveyor pathway, two of the sprockets proximate to the ends of the Ω-shaped configuration and the third in its median zone.

According to the FIG. 8 variant, strictly speaking there is no loop or bend formed in the conveyor pathway; the conveyor pathway is of circular configuration and therefore it is as if the conveyor itself comprises a single circular closed loop. In this case ultraviolet units 70 may be grouped in a very compact zone, one of the ultraviolet lamp units 70 being inside the perimeter of the conveyor pathway and the two other ultraviolet units 70 being outside the perimeter thereof. All of the ultraviolet units direct their rays towards a single zone along the conveyor pathway. For the ultraviolet units outside the conveyor pathway perimeter the sectors A overlap one another and hence have a common portion in which case the sectors A are thus slightly greater than 120°.

Other conveyor pathway configurations may be envisaged, such as an S-shaped pathway.

Moreover the present invention is not restricted to the described and illustrated embodiments but encompasses all modifications, alternatives and expedients within the scope of the appended claims.

In particular, regarding the embodiment of FIGS. 1–5, the angle of enclosure of the conveyor 11 around the source of ultraviolet radiation may be different from the 180° of the horseshoe bend represented.

For example it seems smaller if the bends or loops are simply channel-shaped.

Alternatively the angle may be greater if additional intermediate wheel members are provided for this purpose.

Finally perforate carrier baskets other than those having wire strips as described may be contemplated even though those disclosed are particularly satisfactory.

What I claim is:

1. Apparatus for ultraviolet drying and/or curing solvent free ink on three-dimensional articles, comprising a housing, an endless conveyor arranged at least partly inside said housing and having at longitudinally spaced locations baskets for carrying articles bearing ink to be dried and/or cured, said conveyor having a pathway including, in elevation, at least one bend or loop inside said housing, said bend or loop having an axis of curvature, an elongate ultraviolet lamp disposed proximate to said bend or loop for irradiating a predetermined sector of each article passing over said bend or loop with said sector including a portion of each article being disposed with a respective basket, means for swivelly mounting said baskets on said conveyor about axes parallel to said axis of curvature, so that as the said baskets pass over said bend or loop the portion of the predetermined sector exposed to said elongate ultraviolet lamp varies and said baskets being of perforate construction with perforate and nonperforate portions arranged so that shadows due to the nonperforate portions continuously move along the predetermined sectors of the articles thereby avoiding constantly obstructed spots in the predetermined sectors.

2. Apparatus according to claim 1, wherein said baskets are of wire strip construction.

3. Apparatus according to claim 2, wherein each strip of wire of a said basket lies in a plane, the planes defined by said strips of wire of each basket intersecting along lines parallel to its swivel axis, such that shadows caused by said strips move along the predetermined sector of the basket generally parallel to its swivel axis.

4. Apparatus according to claim 1, wherein said lamp is disposed in the crook of said bend or loop.

5. Apparatus according to claim 4, wherein an intermediate wheel member having its axis of rotation substantially coaxial with said elongate lamp is in mating relation with said conveyor and determines the curvature of said bend or loop.

6. Apparatus according to claim 1, a reflector being associated with said ultraviolet lamp.

7. Apparatus according to claim 6, said portion of said reflector being generally cylindrical with its axis parallel to that of said lamp, the concave side of said cylindrical portion facing the convex side said curved bend or loop, wherein said axis of said cylindrical portion of said reflector is spaced from said ultraviolet lamp and situated closer to said conveyor than said lamp.

8. Apparatus according to claim 7, wherein said cylindrical reflector portion is continued by two planar portions which are parallel to the axes of said intermediate wheel member and converge slightly toward each other.

9. Apparatus according to claim 4, wherein a reflector having two parabolic portions is associated with said ultraviolet lamp, said parabolic portions being disposed back to back facing the concave side of said curved bend or loop of said pathway.

10. Apparatus according to claim 5, wherein said intermediate wheel member comprises a hub arranged coaxially to a fixed socket for one of said axial bases at the ends of said elongate ultraviolet lamp.

11. Apparatus according to claim 10, said hub having a radially extending collar for supporting said intermediate wheel member, wherein said collar has a vent hole.

12. Apparatus according to claim 11, said ultraviolet lamp being disposed in a double-walled duct through which ventilating air is adapted to flow, end bases of said ultraviolet lamp protruding into a lateral part of space between said walls of said duct, said lateral part of said space communicating with another lateral part of said space continuous with said first mentioned lateral part via said vent hole in said collar on said hub.

13. Apparatus according to claim 2, wherein middle sections of said wire strips of said baskets are generally part-circular.

14. Apparatus according to claim 4, there being a plurality of said ultraviolet lamps and a corresponding plurality of said bends or loops in said conveyor pathway, each said ultraviolet lamp being disposed in the crook of a corresponding bend or loop in said conveyor pathway.

15. Apparatus according to claim 1, there being three said ultraviolet lamps, each of said lamps being arranged and directed so that its rays strike a 120° predetermined sector on each of the articles, each said lamp covering a different 120° sector of the articles so that the entire surface of the articles is irradiated.

16. Apparatus according to claim 1, wherein said lamp is disposed along said axis of curvature of said bend or loop.

17. Apparatus according to claim 6, wherein said conveyor is displaced between a portion of said reflector and said ultraviolet lamp.

* * * * *